ial for
3,702,847
PREPARATION OF CARBOXYHYDROXY ALKYL STARCH DERIVATIVES

Robert J. Hathaway, Decatur, Ill., assignor to A. E. Staley Manufacturing Company, Decatur, Ill.
No Drawing. Filed Dec. 16, 1970, Ser. No. 98,905
Int. Cl. C08b 19/06
U.S. Cl. 260—233.3 R    15 Claims

ABSTRACT OF THE DISCLOSURE

Chlorohydroxy acidic reagents, such as chlorohydroxypropionic acid (CHP) and chlorohydroxysuccinic (CHS) acids produced by chlorination of acrylic acid and maleic acids, respectively, are used to introduce carboxyl groups into starch in the presence of an alkaline catalyst. Some of the resulting carboxyhydroxy alkyl starch derivatives, when further modified, are useful in paper manufacture as filler retention aids. It is expected that the modified starches of the invention will also be useful in foods. Cleavage of the ether linkage should take place during metabolism, and the reaction by-products should include glyceric and tartaric acid, both of which are naturally occurring metabolites. The starch derivatives made by the method of this invention exhibit anionic characteristics, and when chlorohydroxypropionic acid reagent is reacted with a cationic corn starch, the resulting product is a substantially improved filler retention aid.

BACKGROUND OF THE INVENTION

The possible uses for materials derived from the modification of starches obtained from sources such as corn, cereal, potato, tapioca and sago are increasing at a rapid rate. Starches, especially cereal starches, are relatively abundant, and therefore less expensive than many other less available materials. Specially modified starch derivatives are finding widespread use in the manufacture of paper. Modified starch filler retention aids are especially important in the manufacture of high grade papers, where one goal is to increase filler retention and decrease processing wastes.

Modified starches and starch derivatives intended for use in foods must produce only non-toxic reaction products or undergo metabolic reactions which produce non-toxic residues. A non-toxic starch derivative can be most valuable for use as a constituent of various food products, for example, as a binder, filler, or coating material for frozen foods which are ingested into the human system. Considerable interest also exists in the rapidly growing processed food industry to fully utilize the inherent economies of starch derivatives in large volume, manufactured food products. There is, therefore, a steadily increasing need for new starch derivatives which may be incorporated into food processing and food products.

The paper industry is of special interest because it is a large volume producer, and requires large quantities of special binders and fillers, especially for better grade papers. There is a great need for improved filler retention aids which will most efficiently retain clay and titanium dioxide pigment wet-end additives in the paper making process. Although there are other filler retention aids besides starch derivatives, the starch derivatives are preferred because they are considerably lower in cost.

DESCRIPTION OF THE PRIOR ART

Glycidic acid is mentioned as a possible reagent for use with starch in U.S. Pat. 2,657,155 issued Oct. 27, 1953. However, no examples are given for such a reaction, and the only reactions described in this patent are directed to the production of water insoluble salts of starch ether carboxylic acids and starch ester carboxylic acids with a polyvalent metal ion. In all the examples given, the sodium salt of monochloracetic acid is reacted with a hot alkaline starch paste. The product is mixed with china clay or casein and then applied to paper and treated with a polyvalent metal salt. There is no other reference in this patent to glycidic acid or to possible reaction products obtained with it, which provides strong support to the belief that the reaction was never performed, especially since the reagent is generally known to be unstable and is not readily available. In any event, the reaction would be impractical for economic reasons, and the patent does not suggest using a readily available starting reagent, such as the acrylic acids and substituted acrylic acids used in my reaction process.

One conventional method of introducing carboxyl groups into starch is by hypochlorite oxidation, but this reaction must be carefully controlled to avoid extensive degradation. In contrast, the reaction of the subject invention proceeds with no degradation. Carboxyl groups can also be introduced into starch products through the direct reaction of starch with ethyl acrylate, but the efficiency rate is only about 15% compared to the method of the invention, which is about 60% efficient. Another known method for introducing carboxyl groups is by the use of chloroacetic acid with an alkaline catalyst, however, this latter method does not introduce hydroxyl groups, and yields are generally much lower than that of the present invention.

To applicant's knowledge, there has been no showing until now that the simultaneous placement of hydroxy groups and carboxyl groups in a starch derivative can be determined through the use of a transitory chlorohydroxy epoxy acid reagent derived from the chlorohydrin of an acrylic acid or substituted acrylic acid treated with alkali. The starch derivatives obtained by this reaction are believed to break down in metabolic processes into non-toxic compounds, thereby making the new starch derivatives useful for a wide range of food applications.

SUMMARY OF THE INVENTION

This invention provides a convenient and direct process for synthesizing alpha-hydroxy carboxy starch ether derivatives which are expected to be useful food additives. In several embodiments, these starch ether derivatives have valuable filler retention properties for use in manufacturing papers.

The acidic reagents used in the practice of the invention are easily prepared by the chlorination of such readily available and relatively inexpensive compounds such as acrylic, methacrylic, fumaric, and maleic acids. The chlorohydrins of these acids, chlorohydroxypropionic acid, chlorohydroxy isobutyric acid, and isomers of chlorohydroxysuccinic acid, can be stored as aqueous solutions. Other reagents, such as glycidic acid, react with water and are therefore more difficult to store. The economies to be realized in a continuous, high volume production process, using the method of the invention, increase proportionately with increasing production volumes.

The particular starting reagent selected must be capable of forming chlorohydroxypropionic acid or a substituted chlorohydroxypropionic acid when reacted with chlorine in water, and when subsequently treated with alkali, a transitory epoxy intermediate structure is formed. When starch is present in the alkaline mixture, the transitory epoxy groups react with substitution occurring primarily at the carbon atom having the least steric hindrance, and the hydroxyl group resulting from the etherification reaction with the starch is always located on the carbon atom adjacent to the carbon atom involved in the ether linkage.

DETAILED DESCRIPTION OF THE INVENTION

In the presently preferred method of the invention, the reagents are made by chlorinating the unsaturated organic acids in water. When acrylic acid is chlorinated, the reagent produced is chlorohydroxypropionic acid (CHP). Maleic acid or fumaric acid, produce chlorohydroxysuccinic acid (CHS) when chlorinated in water. The respective reagent is then reacted with a starch in an alkaline slurry to give a very efficient conversion to the corresponding carboxy ether. A granular starch may also be reacted with the reagents of the invention as is more fully described below.

These ether derivatives are unique because they have an hydroxy group alpha to the carboxyl group. This particular placement of the hydroxy substitution is believed to make these starch derivatives potentially useful in food products, because some of the by-products to be expected from the reaction are naturally occurring non-toxic compounds, such as glyceric acid and tartaric acid. When these starch derivatives break down in the metabolic processes, residues of these types which are natural metabolites are generally considered safe.

The reaction of the chlorohydroxy reagent with starch proceeds best in the presence of calcium hydroxide. When calcium hydroxide is used, it is necessary to conduct the reaction in a nitrogen atmosphere to prevent alkaline degradation of the starch.

The chlorohydroxypropionic acid (CHP)-starch slurry reaction, as presently understood, is believed to proceed generally according to the following steps:

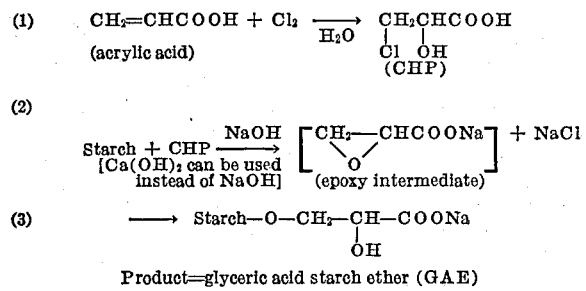

Product=glyceric acid starch ether (GAE)

The above reaction mixture is then neutralized with HCl and isolated with an excellent yield of hydroxy carboxy modified starch at a pH near neutrality. The above starch derivative, when further reacted with a quaternary ammonium reagent, has been used most successfully as a filler retention aid in paper coating using fillers such as titanium dioxide and kaolin clays. It is believed that the filler retention properties are due at least in part to the alpha-hydroxy placement which is characteristic of the above reaction, and also because of the anionic nature of the carboxyl group.

This starch derivative was compared to a carboxy starch derivative resulting from the reaction of starch with ethyl acrylate, to a carboxy starch ester resulting from the direct reaction of starch with maleic anhydride, and to a carboxy starch derivative produced by hypochlorite oxidation of starch. Each of the starch derivatives compared contained the same amount of quaternary ammonium groups as the starch derivative made according to the invention. None of these latter starch derivatives were comparable in filler retention properties to the alkoxy carboxy ether derivative of the invention.

In a second reaction according to the invention, maleic acid is used as follows:

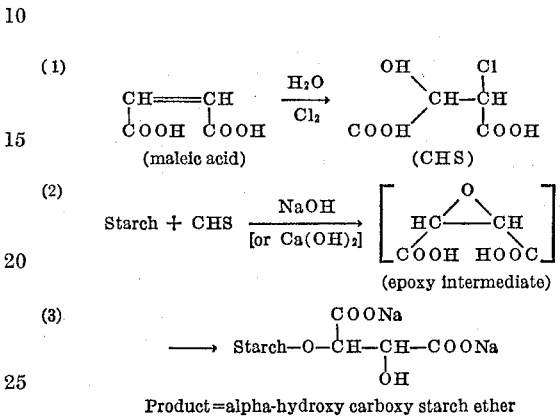

Product=alpha-hydroxy carboxy starch ether

In addition to the acids used above, a series of other substituted acids containing the acrylic acid characteristic structure can also be used to obtain reagents which form the desired epoxy intermediates under alkaline conditions. A partial list of the presently contemplated acids and their respective reagents which they form when reacted with chlorine in water is set forth below:

| Acid: | Reagent |
|---|---|
| Acrylic | Chlorohydroxypropionic acid. |
| Maleic | Chlorohydroxysuccinic acid. |
| Fumaric | Chlorohydroxysuccinic acid. |
| Methacrylic | Chlorohydroxyisobutyric acid. |
| Crotonic | Chlorohydroxybutyric acid. |
| Aconitic | Chlorohydroxy carboxymethyl succinic acid. |
| Citraconic | Chlorohydroxy carboxymethyl succinic (isomer). |
| Itaconic | Chlorohydroxy carboxymethyl succinic (isomer). |
| Mesaconic | Chlorohydroxy methylsuccinic acid. |
| Methylene malonic | Chlorohydroxy methylmalonic acid. |

The above reagents are believed to form a transitory intermediate epoxy structure when subjected to alkaline conditions. As described above, the epoxy group is always located adjacent to the carboxyl group, and when a starch or derivatized starch is reacted with the reagent in an alkaline mixture, an alpha hydroxy, carboxy acid starch ether is produced. The alpha placement of the hydroxy group is determined by the placement of the epoxy group in the transitory structure, and it is believed that the reaction proceeds generally as described, because steric hindrance at the other carbon groups of the acid molecule cause the epoxy group to form at the position of least steric hindrance as indicated.

In addition to those acids specifically set forth above, certain of the long chain fatty acids are considered useful for the practice of the invention. The important requirement for the particular starting acid is that it include within its molecular structure the basic acrylic acid core structure so that the reaction can proceed as described above with the formation of the desired epoxy intermediate, and then to the formation of the particular starch derivatives having the alpha hydroxy placement as described.

The general starch derivative structure contemplated by the invention is encompassed by the following general formula:

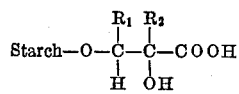

wherein $R_1$ can be hydrogen, methyl, carboxyl, or an alkyl group up to fifteen carbon atoms in length, and $R_2$ can be hydrogen, methyl, carboxy, carboxymethyl, or an alkyl group up to three carbon atoms in length, provided that:

(1) when $R_2$ is hydrogen, $R_1$ can be hydrogen, carboxyl, methyl, or an alkyl group up to fifteen carbon atoms in length;
(2) when $R_1$ is hydrogen, then $R_2$ can be hydrogen, methyl, carboxymethyl, carboxyl or an alkyl group up to three carbon atoms in length;
(3) when $R_1$ is carboxyl then $R_2$ can be carboxymethyl, methyl or hydrogen.

In all combinations, there must be a carboxyl group connected through two carbon atoms to the oxygen atom of the ether linkage and the carbon atom adjacent the carboxyl group also bears a hydroxyl group.

The starting unsaturated acids which are hypochlorinated and reacted with starch under alkaline conditions to obtain the above starch derivatives may be represented by the following general formula:

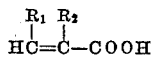

wherein $R_1$ and $R_2$ represent the same combinations set forth above. The intermediate epoxy transitory structure which occurs when the chlorohydrin form of this acid is subjected to alkaline conditions determines the hydroxy placement alpha to the carboxyl as shown above in the general formula for the starch ether.

My invention is applicable to all starches and starch fractions, including dextrins and the waxy and high-amylose starches. If the starch is of vegetable origin, it may be derived from root (e.g., potato, tapioca), stem (e.g., sago) or seed (e.g., the cereals, corn, wheat, rice) of the plant. The starch may have been modified beforehand, in paste or granule form, with acids, enzymes, heat or oxidizing agents. In the case of oxidizing agents, carboxyl groups are introduced and these being anionic, tend to diminish the cationic activity of quaternary starch derivatives. Also the starch or dextrin may have been partially derivatized beforehand as, for example, by reaction with acetic anhydride or with vinyl acetate to form the starch ester of acetic acid or by reaction with propylene oxide to form the hydroxyethyl ether of starch. In some instances, the native starch is first reacted with the reagent of the invention, and the starch ether derivative so obtained may be further modified or reacted with a second reagent, such as a quaternary ammonium reagent to add cationic groups. The important requirement is that the starch have reactive hydroxy groups.

The following specific examples of the reaction of the invention are not intended to limit the invention in any way, but serve to illustrate the reaction method in more detail.

EXAMPLE 1

CHP-corn starch

Chlorohydroxypropionic acid (CHP) reagent was prepared by dissolving 288 grams acrylic acid in 5 liters water and adding $Cl_2$ gas below the surface while stirring rapidly at 15–25° C. The pH was controlled at 1 to 1.5 during the addition by continuous addition of 318 ml. of 10 N sodium hydroxide. Control of pH allows more rapid addition of $Cl_2$, but does not affect the final yield of CHP. The yellow color of excess $Cl_2$ signalled the end of the reaction, after which the solution was aerated to remove $Cl_2$ and neutralized to pH 5 with another 465 ml. of 10 N. NaOH.

The CHP reagent was mixed with 3,000 grams (dry basis) corn starch, 500 grams NaCl, and 150 grams calcium hydroxide to form a slurry, and stirred at 24° C. under a nitrogen atmosphere for 22 hours. The pH was 11.2. The mixture was cooled, neutralized with hydrochloric acid, filtered, and washed with 80–20 water-methanol mixture. The product contained 3.4% carboxyl, dry basis, which was 60% of the theory based on acrylic acid. The degree of substitution (d.s.) for carboxyl is about 0.13.

Reaction of similarly prepared CHP reagents with waxy maize and tapioca starches gave 3.85% carboxyl in both cases, which was 70% of theoretical yield based on acrylic acid, and a d.s. of about 0.15.

EXAMPLE 2

CHS from maleic acid-tapioca starch 49.0 grams (0.5 mol) maleic anhydride was reacted with 700 ml. hot $H_2O$, cooled and neutralized partially with 17.0 grams sodium hydroxide in 100 ml. $H_2O$. The volume was adjusted to 1 liter having pH 2.8, and cooled to 30–35° C. Sodium maleate will precipitate if the solution is cooled further. Chlorine gas was added at 30–35° C. while stirring rapidly. The pH was maintained 1.5 to 2.0 by addition of about 30 ml. 40% NaOH during the reaction. The temperature was maintained at 30–35° C. After 5 hours a permanent yellow color developed indicating excess chlorine. An analysis for inorganic chloride produced during the reaction indicated the yield of chlorohydroxysuccinic acid (CHS) was 90% of theoretical.

One part tapioca starch was suspended in 1.8 parts of the CHS reagent prepared above to form a slurry and treated while stirring with 0.2 part of calcium hydroxide. The mixture was stirred for 22 hours at 42° C. (pH 11.1), then neutralized to pH 5 with HCl, filtered, washed with water and air dried. The product contained 2.1% carboxyl (dry basis), which is a carboxyl d.s. of about 0.04.

EXAMPLE 3

CHS from fumaric acid-tapioca starch

To prepare chlorohydroxysuccinic acid (CHS) reagent, 58 grams (.5 mol) fumaric acid was dissolved in 1 liter water and neutralized to pH 3.4 with 18.5 g. (.25 mol) of calcium hydroxide. Both fumaric acid and its calcium salt were only slightly soluble. Chlorine gas was introduced below the surface, while agitating briskly at room temperature. The pH was maintained between 2.4 and 3.4 by addition of calcium hydroxide. The fumaric acid required about 2 hours to react, after which excess chlorine was present as determined by titration with potassium iodide and sodium thiosulfate. The solution volume was 1160 ml.

50 grams dry basis of tapioca starch was slurried in 31 mls. water and 68.5 mls. of the above CHS reagent. 6 grams calcium hydroxide was added and the mixture stirred 22 hours at 42° C. Hydrochloric acid was added to pH 5 and the product filtered and washed with water.

The carboxyl content was 2.8%, which is 66% of theory based on fumaric acid. The carboxyl d.s. for this sample was about 0.055, or ½ of the total carboxyl present.

EXAMPLE 4

CHP-dry tapioca starch

Chlorohydroxypropionic acid (CHP) reagent was prepared by dissolving 155 grams acrylic acid in 3 liters $H_2O$ and adding $Cl_2$ gas below the surface while stirring rapidly at room temperature with some cooling. When the solution turns yellow due to excess $Cl_2$, the reaction is complete. Excess $Cl_2$ is removed by bubbling air through the solution. Methyl red indicator may be used to determine presence of excess $Cl_2$.

The reagent was then neutralized to a pH of 6 and concentrated under vacuum to a syrup. NaCl crystallized out during concentration. The resulting product contained 50% CHP by volume (determined by direct assay for oxirane).

The CHP reagent (60 ml.) was warmed at 42° C. and converted to the epoxy form by portion-wise addition of 10 N NaOH (50%) at 42° C. The pH was maintained between 11 and 12. Conversion in the epoxy intermediate was rapid at 42° C., and used about 35 ml. NaOH, until a stable pH at 11.5 was obtained. The solution was cooled to 5° C., and an additional 26 ml. of 10 N NaOH was added. About 5% excess NaOH is needed, based on starch.

The CHP reagent was then dry mixed with 230 grams tapioca starch (200 grams dry basis) by rapid stirring. The granular product was dried in vacuum at 45°–50° C. to 11% $H_2O$. The slurry pH was 12.1. Titration with N/10 HCl to phenolphthalein end-point showed 1.1 milliequivalent alkalinity per gram. The product was put in a closed container under nitrogen and heated at 42° C. for 22 hours. It was then suspended in 50–50 MeOH-$H_2O$ neutralized to pH 7 with HCl, filtered and washed free of chloride (by $AgNO_3$ test). The product contained 4.3% COOH, showing a 70% efficiency calculated on acrylic acid and 80% efficiency based on the CHP assay. The same efficiency was obtained by reaction at 80° C. for one hour. The carboxyl d.s. for this sample calculated to about 0.18.

EXAMPLE 5

CHP-modified corn starch

CHP reagent was prepared in a manner similar to that described in Example 1. 40 ml. of the reagent containing .013 mol CHP was diluted with 15 ml. $H_2O$, warmed to 40° C., and the pH brought to between 11 and 12 with 5 N NaOH. A total of 28 ml. NaOH was added before the pH became stable at 11.2. 50 grams of a modified corn starch containing cationic groups (.33% N) prepared generally as described in U.S. Pat. 3,346,563 and 18 g. sodium sulfate were added. The mixture was stirred under a nitrogen atmosphere for 10 hours at 60° C., then neutralized with dilute hydrochloric acid, filtered and washed. The product contained 0.43% carboxyl (dry basis), which calculated to a carboxyl d.s. of about 0.015.

A cooked paste of this product was added at 5 lbs. per ton to a paper furnish containing alum, $TiO_2$ filler, rosin, and an anionic dispersant. The retention of $TiO_2$ was 92%, compared to 83% and 50% retention values for cationic corn starch and a control containing neither starch, respectively.

EXAMPLE 6

CHP-hydroxypropyl-waxy dextrin 2000 grams dry basis tapioca starch, 670 grams NaCl and 67 grams calcium hydroxide were slurried in 3300 ml. $H_2O$ and reacted with 160 ml. propylene oxide for 22 hours at 42° C. The hydroxypropylated starch was then treated with CHP reagent made from 140 grams acrylic acid in a manner similar to that described in Example 1. This mixture was reacted further for 22 hours at 42° C., using an additional 50 grams calcium hydroxide. The product was isolated as in Example 1. The carboxyl content was 2.9% dry basis, which is 51% of theoretical based on acrylic acid. This sample had a carboxyl d.s. of about 0.11.

The product was treated with HCl catalyst in the dry state (12% $H_2O$) so that a slurry pH was 2.8. The dry product was then heated for 62 hours at 75° C. in a pressure vessel. The resulting dextrin, after treating with NaOH in MeOH-$H_2O$ slurry, was isolated in a manner described in Example 1.

In another experiment, propylene oxide and CHP reagent were reacted simultaneously with waxy starch. The carboxyl content of the product was 3.0% dry basis, which was 68% of theoretical based on acrylic acid. The carboxyl group degree of substitution per anhydroglucose unit for this latter sample was about 0.12.

EXAMPLE 7

CHMS from itaconic acid-tapioca starch

Chlorohydroxymethylsuccinic acid (CHMS) was prepared from a solution of 52 grams itaconic acid (monosodium salt) in 1 liter $H_2O$ by bubbling chlorine gas beneath the surface while stirring at room temperature. After one hour the solution turned yellow, due to excess $Cl_2$. The $Cl_2$ was removed by bubbling air through the solution for a short time.

100 grams tapioca starch (dry basis) was slurried in 174 mls. of the above CHMS reagent and 8 grams calcium hydroxide, and stirred 20 hours at 42° C. The pH was 11.5. The product was isolated as described in Example 2. The carboxyl content was 1.9% which is 30% of theoretical based on itaconic acid, and which figures to a carboxyl d.s. of about 0.04.

EXAMPLE 8

Isolated sodium CHP-tapioca starch 72 grams acrylic acid in 2 liters water was treated with chlorine gas at room temperature about one hour until yellow. The solution was aerated to remove excess chlorine and neutralized to pH 6.9 with 40% NaOH. The solution was concentrated under vacuum to a thin syrup, then concentrated further in the presence of n-butyl alcohol as an aid to completely remove water. The resulting butanol solution was filtered to remove 60 grams sodium chloride, then treated with acetone to precipitate sodium CHP as a gummed mass. This was dissolved in 2 parts hot ethanol, 5 parts acetone added and the solution cooled to obtain a precipitate which was filtered and dried. The product contained 84% sodium CHP by weight. 100 grams tapioca starch (dry basis) in 185 ml. water was treated with 7.2 grams of the above product and 7 grams calcium hydroxide with stirring at 42° C. for 21 hours. The product was isolated as described in Example 1, and found to contain 1.3% carboxyl which is 60% efficiency based on sodium CHP, and which calculated to a carboxyl d.s. of about 0.04.

In a similar experiment, the sodium salt of chlorohydroxysuccinic acid (NaCHS) was obtained after reacting chlorine and maleic acid as described in Example 2. Concentration under vacuum gave white crystals of crude NaCHS which were isolated by filtration and assayed as 73% NaCHS. 4.8 grams were reacted with 50 grams tapioca starch as described above. The product contained 1% COOH which was 31% of theoretical based on NaCHS, and a carboxyl d.s. of about 0.036.

EXAMPLE 9

Aconitic, citraconic acids-tapioca starch

Aconitic acid and citraconic acid were also used according to the method of Example 2. The reactions were successful, but the most promising starting reagent presently appears to be acrylic acid.

The most consistent yields at the greatest reaction efficiency were obtained using the chlorohydroxypropionic acid (CHP) reagent derived from acrylic acid in either a dry or slurry reaction with starch. The following table gives statistics for a series of reaction runs using CHP and starch. The reaction efficiency decreases as the level of substitution increases. This is shown in the following table.

TABLE.—STARCH REACTIONS WITH CHLOROHYDROXYPROPIONIC ACID REAGENTS

| Sample | CHP added¹ to starch | | Percent COOH in product | Percent effic. based on CHP |
| --- | --- | --- | --- | --- |
| | Percent by wt. | Meq./g. | | |
| 1 | 5.4 | 0.44 | 1.6 | 84 |
| 2 | 16 | 1.30 | 4.3 | 77 |
| 3 | 32 | 2.60 | 6.1 | 58 |
| 4 | 64 | 5.20 | 10.0 | 52 |

¹ Percent by weight CHP added to dry starch.
NOTE.—Meq./g is milliequivalents CHP per gram of dry starch. Max. carboxyl d.s. for above samples about 0.48-0.36.

These reactions were carried out as in Example 4, using concentrated CHP obtained in 75% of theoretical yield from acrylic acid.

The particular starch selected for the reaction is in part determined by the intended end use. When the product is to be used as a filler retainer in paper coating, starch containing cationic groups is usually selected.

The alpha-hydroxy carboxy alkyl starch ethers made according to the invention have proven useful as a filler retention aid in paper manufacturing. For example, a cationic-anionic corn starch prepared as in Example 5 by reacting a quaternary ammonium substituted corn starch with a small amount of CHP reagent was tested for filler retention in paper handsheets, and proved superior to the conventional starches used for this purpose. Because α-hydroxy carboxylic acids are natural metabolites, e.g., glyceric acid and tartaric acid, the hydroxyl group present in the carboxyl alkyl starch ethers of the invention have less toxicity when these starches are ingested in foods and metabolized.

Since many embodiments of this invention may be made and since many changes may be made in the embodiments described, the foregoing is interpreted as illustrative and the invention is defined by the claims appended hereafter.

I claim:

1. A method of preparing an alpha-hydroxy carboxy starch ether derivative, the steps comprising forming a slurry by mixing a starch material with water, adjusting the slurry to an alkaline pH by the addition of an alkali, and reacting said starch material with a chlorohydroxycarboxylic acid having an hydroxy group alpha to the carboxyl group, and which has an epoxy intermediate transitory structure under alkaline conditions, thereby establishing the placement of an hydroxy group alpha to the carboxyl group in the acid derived substituent of the starch ether resulting from the reaction.

2. The method of claim 1, in which the chlorohydroxy carboxylic acid is derived from the hypochlorination reaction of an acrylic acid or a substituted acrylic acid selected from the group consisting of acrylic, maleic, fumaric, methacrylic, crotonic, aconitic, citraconic, itaconic, mesaconic, and methylene malonic acid, and long chain fatty acids having within the molecular structure a basic acrylic acid core structure capable of forming a 2,3-epoxy intermediate, and further capable of determining the alpha placement of the hydroxy group in the resulting alpha hydroxy carboxy starch ether derivative.

3. The method of claim 1, in which the chlorohydroxycarboxylic acid is chlorohydroxypropionic acid and the starch ether derivative resulting from the reaction is an alpha-hydroxy propyl starch ether.

4. The method of claim 1, in which the chlorohydroxycarboxylic acid is derived from the hypochlorination reaction of an acid selected from the group consisting of acrylic, fumaric and maleic acid.

5. The method of claim 1, in which the starch material is a native or modified starch derivative taken from the group consisting of corn, wheat, potato, tapioca and waxy maize starch.

6. The method of claim 1, in which the chlorohydroxycarboxylic acid is selected from the group consisting of chlorohydroxypropionic acid, chlorohydroxysuccinic acid and its cis and trans isomers, chlorohydroxybutyric acid, chlorohydroxyisobutyric acid, chlorohydroxy carboxymethyl succinic acid, chlorohydroxy methylsuccinic acid and its cis and trans isomers and chlorohydroxy methylmalonic acid.

7. The method of claim 1, in which the chlorohydroxycarboxylic acid is prepared by chlorinating an organic acid selected from the group consisting of acrylic acid, fumaric acid, maleic acid, methacrylic acid, crotonic acid, aconitic acid, citraconic acid, itaconic acid and methylene malonic acid.

8. The method of claim 1, in which the chlorohydroxycarboxylic acid is chlorohydroxypropionic acid, the alkali is sodium hydroxide and including the steps of maintaining the reaction temperature at 42° C. for about 22 hours, then acidifying the reaction mixture with acetic acid to a pH of about 5–7, and washing the acidified reaction mixture with water to isolate said starch ether derivative from all excess water soluble reagents and byproducts of the reaction.

9. A method of preparing an hydroxy carboxy starch ether derivative, the steps comprising:

(I) preparing an acid reagent capable of forming an epoxy intermediate transitory molecule under alkaline conditions which is then capable of forming a substituent group of the starch ether derivative by hypochlorinating an unsaturated organic acid selected from the group consisting of acrylic acid, fumaric acid, maleic acid, methacrylic acid, crotonic acid, aconitic acid, citraconic acid, itaconic acid, methylene malonic acid and long-chain alpha beta unsaturated fatty acids including a carbon chain up to eighteen carbon atoms in length, said unsaturated organic acid being represented by the general formula:

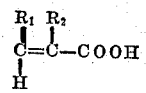

in which $R_1$ is hydrogen, carboxyl, or an alkyl group up to fifteen carbon atoms in length, and $R_2$ is hydrogen, carboxymethyl, or carboxyl, or an alkyl group up to three carbon atoms in length, provided that, (a) when $R_2$ is hydrogen, $R_1$ is hydrogen, carboxyl, or an alkyl group up to fifteen carbon atoms in length;

(b) when $R_1$ is hydrogen, $R_2$ is carboxymethyl, carboxyl, or an alkyl group up to three carbon atoms in length;

(c) when $R_1$ is carboxyl, then $R_2$ is carboxymethyl, methyl and (II) reacting said acid reagent under alkaline conditions with a starch material selected from the group consisting of native starches and dextrins derived from corn, wheat, sorghum, waxy maize, potato, tapicoa, sago, cassava, and modified starches derived from the above native starches including starch and dextrins which have been oxidized, hydrolyzed, hydroxyalkylated, or combined with reagents containing cationic groups.

10. The method of claim 9, in which the substituent group of the starch ether derived from the reagent includes a first carbon atom which carries a carboxyl and a hydroxyl group, said first carbon atom being adjacent a second carbon atom which is involved in the ether linkage.

11. The method of claim 9, in which the substituent group of the starch ether derived from the reagent includes a carbon atom having both a carboxyl and a hydroxyl group and is separated from the oxygen atom on the ether linkage by one carbon atom.

12. The starch ether derivative produced by the method of claim 1, represented by the general structural formula:

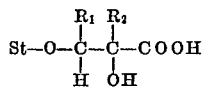

in which $R_1$ is hydrogen, carboxyl, or on alkyl group up to fifteen carbon atoms in length, and $R_2$ is hydrogen, carboxymethyl, carboxyl or a straight chain alkyl group up to three carbon atoms in length, provided that:

(a) whene $R_2$ is hydrogen, $R_1$ is hydrogen, carboxyl, or an alkyl group up to fifteen carbon atoms in length;

(b) when $R_1$ is hydrogen, $R_2$ is carboxymethyl, carboxyl or an alkyl group up to three carbon atoms in length;

(c) when $R_1$ is carboxyl, $R_2$ is methyl, or carboxymethyl; and (d) St represents a starch material selected from the group consisting of native starches and dextrins derived from corn, wheat, sorghum, waxy maize, potato, tapioca, sage, cassava, and modified starches derived from the above native starches including starch and dextrins which have been oxidized, hydrolyzed, hydroxyalkylated, or combined with reagents containing cationic groups.

13. The alpha-hydroxy carboxy starch ether derived from the reaction of a chlorohydroxycarboxylic acid capable of forming an epoxy intermediate transitory molecule in the presence of an alkali, said acid being selected from the group consisting of chlorohydroxypropionic acid, chlorohydroxysuccinic acid, chlorohydroxybutyric acid, chlorohydroxyisobutyric acid, chlorohydroxy, carboxymethyl succinic acid, chlorohydroxymethylsuccinic acid, and chlorohydroxy methylmalonic acid, said acid being reacted with a starch material which is taken from the group consisting of native or modified corn, wheat, potato, tapioca and waxy maize starches.

14. A starch ether derivative resulting from the reaction of an unsaturated organic acid with chlorine in water which is then reacted with a starch material, said starch ether derivative being represented by the following general formula:

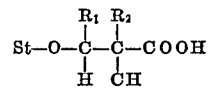

in which $R_1$ is hydrogen, methyl, carboxyl, or an alkyl group up to fifteen carbon atoms in length, and $R_2$ can be hydrogen, methyl ethyl, propyl, carboxymethyl, or carboxyl, provided that:

(a) when $R_2$ is hydrogen, $R_1$ is hydrogen, carboxyl, or an alkyl group up to fifteen carbon atoms in length;

(b) when $R_1$ is hydrogen, $R_2$ is carboxymethyl, carboxyl, or an alkyl group up to three carbon atoms in length;

(c) when $R_1$ is carboxyl, then $R_2$ is carboxymethyl, or methyl;

(d) wherein the oxygen atom of the starch ether linkage is always separated by at least one carbon atom from the carbon atom carrying both an hydroxy and a carboxy group;

(e) the hydroxy group is always carried by the same carbon atom of the acid derived substituent which carries the carboxyl; and (f) St is a starch material selected from the group consisting of native starches and dextrins derived from corn, wheat, sorghum, waxy maize, potato, tapioca, sago, cassava, and modified starches derived from the above native starches including starch and dextrins which have been oxidized, hydrolyzed, hydroxyalkylated, or combined with reagents containing cationic groups.

15. The starch derivative of claim 13, in which the starch material is selected from the group consisting of modified corn starch having cationic groups, alkylated corn starch, topioca starch, dextrins, hydroxypropylated waxy maize starch, and waxy maize starch.

References Cited
UNITED STATES PATENTS 2,599,620   6/1952   Filbert _____ 260—209

DONALD E. CZAJA, Primary Examiner

M. I. MARQUIS, Assistant Examiner

U.S. Cl. X.R.

260—233.5